United States Patent Office 3,098,826
Patented July 23, 1963

3,098,826
RECLAMATION OF HYDRAULIC FLUID
Warren C. McMordie, Jr., and George J. Petrovich, Jr., Fort Worth, Tex., assignors to General Dynamics Corporation, San Diego, Calif., a corporation of Delaware
No Drawing. Filed Dec. 27, 1960, Ser. No. 78,245
12 Claims. (Cl. 252—78)

This invention relates in general to the reclamation of used silicone base hydraulic fluid, and more particularly, to a method for recovering the silicone base of the fluid free from decomposition products and other contaminants and for reblending the recovered base to produce a satisfactory hydraulic fluid similar in its characteristics to the original fluid.

It is necessary that special silicone base hydraulic fluids be used in certain aircraft which are subjected to elevated temperatures during sustained supersonic flight. Considerable quantities of such fluid are lost, but recovered in contaminated and decomposed form from the aircraft hydraulic systems as the result of rework operations, maintenance of the aircraft and hydraulic pumping units, system flushing, normal leakage and draining of contaminated fluids from the pumping units. Since the hydraulic fluid is expensive, this represents a considerable monetary loss unless the fluid, or a part thereof, may be reused.

A considerable portion of the expense of the hydraulic fluid is accounted for by the silicone base material. If, in lieu of replacing the used hydraulic fluid with virgin fluid, the base material of the used fluid can be recovered in a condition substantially free of decomposition products and contaminants and reblended to produce a hydraulic fluid of satisfactory properties, a substantial economy may be effected. It is, accordingly, an object of this invention to produce such a process.

It is another object of this invention to provide a method whereby the silicone base of the used hydraulic fluid may be substantially freed of decomposition products and contaminants and may be analyzed and reblended with additional constituents to produce a second silicone base hydraulic fluid substantially similar in makeup to the original hydraulic fluid and of acceptable properties for hydraulic system usage.

Other objects and advantages of this invention will become apparent from the following description.

In broad outline, the invention comprises a process for the reclamation of the silicone base stock of a used hydraulic fluid, with removal of the base stock being accomplished by means of chemical and physical separations embodied in filtration and first and second extraction steps. Generally the hydraulic fluid as recovered after use, contains a variety of contaminants, such as metal particles, sludge, water, fragmented polysiloxane, free acids and free alcohols; and means are provided herein for their elimination. The subsequent reblending of the base stock is accomplished by quantitative instrumental analysis and calculated additions of additives. It should be noted that use of the term "silicone" herein to designate the base stock of the hydraulic fluid, i.e., hexa (2-ethyl butoxy) disiloxane, is in conformance with the industrial practice of using the term generically to designate those compounds containing silicon and organic groups in the molecule in which silicon is present in sufficient amounts to affect the properties measurably.

In particular, the invention is suited to the processing of the following hydraulic fluids and to the recovery of their silicone base component, hexa (2-ethyl butoxy) disiloxane, which, it should be noted, is an expensive material and difficult to obtain. These fluids are designated, respectively, hydraulic fluid "A" and hydraulic fluid "B" and are composed as follows.

Hydraulic fluid A—Components: Percent by weight
  (1) Hexa (2-ethyl butoxy) disiloxane_____ 78.88
  (2) XF–371 silicone (methyl ethyl silicone)__ 4.1
  (3) p,p' Dioctyldiphenylamine_____ 2.0
  (4) Quinizarin _____ .02
  (5) Di (2-ethyl hexyl) sebacate_____ 15.00

100.00

Hydraulic fluid B—Components:
  (1) Hexa (2-ethyl butoxy) disiloxane_____ 93.18
  (2) XF–371 silicone (methyl ethyl silicone)__ 4.80
  (3) p,p' Dioctyldiphenylamine_____ 2.00
  (4) Quinizarin _____ 0.02

100.00

The function of each of the above components is as follows:

(1) Hexa (2-ethyl butoxy) disiloxane is the base stock for the fluid.
(2) XF–371 silicone (methyl ethyl silicone) is used as a viscosity improver.
(3) p,p' Dioctyldiphenylamine serves as an oxidation inhibitor.
(4) Quinizarin is used as an oxidation inhibitor and a chelating agent.
(5) Di (2-ethyl hexyl) sebacate is used as a rubber swelling agent.

Metal and water are usually picked up by the hydraulic fluid during use, while the acids, alcohols, and sludge are products of oxidation and/or decomposition of the fluid. The effect of the metal and sludge is to block hydraulic valves and cause excessive wear on pumps after prolonged usage. The water and alcohol will react with the methyl ethyl silicone thickener of the above hydraulic fluids to cleave the polymer, thereby reducing its molecular weight. This in turn will degrade the viscosity of the hydraulic fluids. The reaction is either one of alcoholysis or hydrolysis and is acelerated by heat. Free alcohols will lower the flash point of the fluid as well. Free acids will cause corrosion of metal surfaces. Alcohols and acids are formed as a result of the oxidation and subsequent decomposition of the disiloxane base fluid and the di (2-ethyl hexyl) sebacate—if present—as well as some of the other additives. As the concentration of these contaminants increases, a point is reached where the fluid can no longer be used. It is then necessary to separate the remaining useable components from the fragmentated ones and to reblend a new fluid, as more fully described hereinafter.

The following description of the process of the invention will be directed to the hydraulic fluid A, since it contains the same ingredients as hydraulic fluid B with but one addition, namely, di (2-ethyl hexyl) sebacate. When the process is used for reclamation of the base stock of used hydraulic fluid B, no quantitative analysis is made for di (2-ethyl hexyl) sebacate, and of course none of this ingredient is added in the reblending stage.

Initially, the hydraulic fluid A, contaminated through prior use, is passed through a waste cotton filter. This removes metal particles, sludge, and water. It is preferable that the water concentration be kept below 125 parts per million to prevent hydrolysis. The concentration can be determined by Karl Fisher analysis. After filtering, the fluid is treated in an extraction phase with alcoholic potassium hydroxide.

*First Extraction*

The alcoholic potassium hydroxide should be prepared from a .115 N solution of purified methanol and potassium hydroxide (7 grams potassium hydroxide plus 1050 ml. methanol). The solution is heated, as on a hot plate, for approximately five minutes to digest the same and effect the solution and is then filtered through a fine porosity fritted glass. The normality of the solution is critical; inasmuch as a solution which is too weak will not extract, whereas a solution which is too strong will gel the fluid. Methyl ethyl silicone is not soluble in alcoholic potassium hydroxide, while quinizarin, p,p' dioctyldiphenylamine and di (2-ethyl hexyl) sebacate are each soluble therein. Hexa (2-ethyl butoxy) disiloxane is not substantially soluble either in methanol or alcoholic potassium hydroxide and is extracted in a second extraction, presently described. A portion of the free alcohols in the fluid is removed in the instant first extraction, since the alcohols are more soluble in the alcoholic potassium hydroxide than the hydraulic fluid mixture. Also extracted in this phase of the process are the free acids, which are neutralized by the potassium hydroxide.

In making this extraction, one volume of alcoholic potassium hydroxide is added to two volumes of hydraulic fluid. The alcoholic potassium hydroxide is added to the fluid, mixed thoroughly for ten minutes and allowed to settle into two distinct layers; or it may, in the alternative, be centrifuged. The top layer, containing alcoholic potassium hydroxide, extracted additives, and contamination, is discarded. The lower layer is comprised of hexa (2-ethyl butoxy) disiloxane and methyl ethyl silicone, and is retained. A deep purple color will occur on the first addition of the alcoholic potassium hydroxide. This is due to the quinizarin, as it is purple in a basic solution. Sufficient alcoholic potassium hydroxide is mixed with the fluid in a series of washings to effectively remove all of the quinizarin and lower the di (2-ethyl hexyl) sebacate and amine concentrations. After completion of the extraction, the percent by weight of the remaining additives in the disiloxane fluid will be as follows.

Additive: Nominal percent by weight
Di (2-ethyl hexyl) sebacate_____ 4.3
p,p' Dioctyldiphenylamine_____ 0.7
Quinizarin _____ 0.0
Methyl ethyl silicone_____ 4.4

To achieve the above, it will be necessary to conduct approximately six washings. As the washings progress, the alcohol layer will become progressively lighter in color as the quinizarin concentration decreases. The fluid must be washed until a clear layer is obtained, indicating removal of all the quinizarin. It is preferable that all the quinizarin be removed in this phase, since this additive is extremely important and its concentration in the reblended fluid is critical. If not so removed, a careful analysis—as by colorimetric procedures—must be made to determine the quantity of residual quinizarin; and such quantity must be taken into consideration in the reblending. Accordingly, it is preferred to fully extract the quinizarin at this stage, permitting accurate determination of the quantity of this constituent in the reblended fluid simply by addition of the entire quantity desired during reblending, without the necessity of the prior colorimetric or other analysis.

The quinizarin concentration is critical because it controls the oxidation-corrosion stability of the reblended fluid. If no quinizarin is present in the fluid, a greater and more rapid breakdown of the methyl ethyl silicone thickener will occur.

The following tabulation illustrates the effect of quinizarin on oxidation-corrosion of silicone base hydraulic fluid.

| Percent by weight of quinizarin added to final blend [1] | Percent change in viscosity after oxidation-corrosion stability test | Change in acid number after oxidation-corrosion test |
|---|---|---|
| 0.0 | [2] 38.0 | [2] .20 |
| 0.005 | [2] 36.0 | [2] .25 |
| 0.015 | [2] 25.0 | [2] .75 |
| 0.20 | [2] 21.0 | [2] .95 |

[1] All other components are maintained at their proper percent by weight in accordance with the formulation heretofore given for the hydraulic fluid.
[2] Average change.

If too much quinizarin is present, reactions with metals will occur at elevated temperatures, causing sludges to form. Copper is the metal most easily attacked by the products of the quinizarin upon oxidation. Also, the addition of quinizarin contributes to a higher acid number change after an oxidation-corrosion stability test. Therefore, the correct amount of this constituent must be in the reblended fluid.

After the hydraulic fluid has been treated with alcoholic potassium hydroxide, it is washed free of any residual potassium hydroxide. This is accomplished by washing with methanol only. The methanol should be free from solids and of low water content, less than one percent water being desirable. Generally two washings will be sufficient to remove any residual potassium hydroxide which would tend to remain in the extracted disiloxane. The potassium hydroxide is selectively soluble in the methanol and is easily removed. To determine if all of the potassium hydroxide has been removed, a portion of the methanol layer can be withdrawn and a drop of phenolphthalein added. If no red color appears, all the potassium hydroxide has been removed. In the alternative, a pH can be determined on a pH meter. All of the potassium hydroxide must be removed as it would otherwise react with the methyl ethyl silicone thickener and degradate the viscosity of the polymer. The remaining mixture is then treated in the second extraction process.

Methyl alcohol and potassium hydroxide, utilized as above, have been found particularly satisfactory and superior to vacuum distillation for recovery of the hexa (2-ethyl butoxy) disiloxane for a variety of reasons. It has been found preferable from an economy standpoint to recover all of the disiloxane and blend new ingredients therewith, rather than to add disiloxane, an expensive ingredient as heretofore indicated. A straight-forward vacuum distillation of the contaminated fluid is not satisfactory in this regard, since part of the disiloxane cannot be recovered by distillation. Further, the additives which do distill increase in concentration, which forces an addition of disiloxane to the reblended fluid. Also, some forms of contamination and impurities will distill along with the base stock fluid. This is, of course, undesirable since it will contaminate the base stock and defeat the purpose of distillation. Further, distillation of the base stock requires high temperatures, i.e., in the vicinity of 300° C. at 20 mm. mercury. If the methyl ethyl silicone is not removed prior to distillation, it will fragment at the high temperatures and the distillate will be contaminated with fragmented constituents. Distillation is therefore not alone sufficient to produce a purified base stock.

Second Extraction

The second extraction is initiated by adding acetone to the disiloxane, methyl ethyl silicone mixture. The acetone should be free from solids and of low water content, the latter preferably less than one percent. Two volumes of acetone are used for every one volume of the fluid mixture. The methyl ethyl silicone is insoluble in the acetone, while the hexa (2-ethyl butoxy) disiloxane, along with the remaining small percentage of di (2-ethyl hexyl) sebacate and p,p' dioctyldiphenylamine are soluble in the acetone. The mixture is agitated and allowed to settle for 24 hours or it may be centrifuged. Where allowed to settle, two distinct layers form, the lower one being the methyl ethyl silicone, while the upper one contains acetone, hexa (2-ethyl butoxy) disiloxane, p,p' dioctyldiphenylamine and di (2-ethyl hexyl) sebacate.

The acetone mixture is drawn off from the methyl ethyl silicone. Since the polysiloxane thickener precipitates from the acetone-disiloxane mixture in the order of its molecular weight, a small amount of methyl ethyl silicone will not be extracted. This is not harmful to the disiloxane, as new methyl ethyl silicone will be added to the final blend. A viscosity curve can be established to determine the exact percent by weight of the remaining methyl ethyl silicone.

The acetone-disiloxane mixture is then placed in a vacuum distillation apparatus and the acetone is distilled off. No vacuum is to be used while the bulk of the acetone is distilling, as it is not necessary. When substantially all of the acetone is removed, nitrogen is then bubbled into the remaining mixture and a vacuum is drawn on the system. This will remove all residual acetone and methanol. The mixture is then heated to 150° C., which is the boiling point of 2-ethyl-1-butanol. 2-ethyl-1-butanol is the primary alcohol found either free in the hydraulic fluid and/or which results from the breakdown of the hexa (2-ethyl butoxy) disiloxane. By heating at 150° C. ±5° C. for thirty minutes under 20 mm. mercury vacuum, substantially all of the butanol is removed. This is necessary since all the 2-ethyl-1-butanol is not removed by the alcoholic potassium hydroxide extraction.

Once the butanol extraction is completed, the fluid is allowed to cool under vacuum below 100° C. The vacuum is then removed and the fluid transferred to the blending tank to await analysis and reblending. The fluid is now virtually free of alcohols, acids and water.

The residual fluid is now ready to be analyzed for quantitative concentration of di (2-ethyl hexyl) sebacate, p,p' dioctyldiphenylamine, and methyl ethyl silicone. The remainder of the fluid is hexa (2-ethyl butoxy) disiloxane.

Quantitative Analysis

The analysis for the amine and the sebacate are accomplished by employing the infra-red spectrophotometer, the following being a step-wise procedure for the analysis.

*Di (2-ethyl hexyl) sebacate.*—C=O which absorbs at 5.8 microns may be selected as the peak to measure, since there is no absorption in this region by any of the other components. Standards are then made varying the concentration of di (2-ethyl hexyl) sebacate to establish a known curve in which said concentration is plotted against transmission. Using a .025 mm. path length in a sodium chloride cell, the sample of non-blended reclaimed disiloxane base stock fluid is introduced into the sample cell. A sodium chloride blank is used in the reference cell. The base line is set at 100% transmission. This allows a direct reading of percent transmission of the samples and affords maximum sensitivity. The percent transmission at 5.8 microns is read and plotted on the above established curve and the exact percent by weight of the sebacate thereby determined. Note that this analysis is not necessary for hydraulic fluid B.

*p,p' Dioctyldiphenylamine.*—Standards are made varying the concentration of amine to establish a curve, as above, using as variables, percent by weight of the p,p' dioctyldiphenylamine and transmission. The N—H bond which absorbs at 2.9 microns is selected as the peak to be measured. To measure the N—H it is necessary to blank out some of the other components, as they would interfere in this region. This is then, a differential analysis. The blanking material is composed of disiloxane and sebacate made up to known concentrations, omitting the amine. The concentration of sebacate which is used is the same as that which is present in the reclaimed base stock fluid. The remainder of the blanking standard is disiloxane. The disiloxane must be distilled so as to remove alcohols which would interfere, as they absorb in the same region as the amine. If the disiloxane is not distilled the OH bond will cause a negative peak in the desired region. Using a 1.0 mm. path length in a sodium chloride cell, the sample is introduced into the sample cell. The blanking material is introduced into the reference cell having the same path length. The percent transmission is determined by the base line method and is then plotted on the above established curve. The percent by weight of amine present may then be read from the curve.

*Methyl ethyl silicone.*—The quantity of this component is determined by viscosity curves. Such curves may be established by plotting the viscosity of the methyl ethyl silicone versus the percent by weight of same. Ascertainment of the viscosity will then yield the desired percent by weight.

Once there is determined the percent by weight of the sebacate, amine, and the polysiloxane thickener which remain in the disiloxane base fluid, the proper amount of each of these to add to the disiloxane can be calculated. A hypothetical illustration of these calculations is as follows:

Assume 20 gms. of reclaimed base stock fluid and that infra red analysis gives the following percentages of other components present in the disiloxane base stock after the extraction process:

Amine (percent by weight)=0.8
Sebacate (percent by weight)=3.3
Methyl ethyl silicone (percent by weight)=1.0
Specific gravity of base stock fluid=.928
Basis (B)=(20 gms.) (94.9% disiloxane)=18.98 gms. disiloxane present in 20 grams of base stock Using a weight relationship with the disiloxane quantity determinative:

$$\frac{(18.98)(100)}{78.9} = 24.05 \text{ grams}$$

=total weight of reblended fluid (R)

| Composition | Specification percent by weight | Weight of each component (R×2) | Percent in base stock | Weight of each component in base stock (4×B) | To add [1] (3−5) |
|---|---|---|---|---|---|
| Disiloxane | 78.9 | *Grams* 18.98 | 94.9 | *Grams* 18.98 | *Grams* 0 |
| Sebacate | 15.0 | 3.61 | 3.3 | .66 | 2.95 |
| Amine | 2.0 | .48 | 0.8 | .16 | .32 |
| Methyl ethyl silicone | 4.1 | .99 | 1.0 | .20 | .79 |
| Quinizarin | 0.013 | .0031 | 0.0 | 0.0 | 0.0031 |
| | | 24.0631 | | 20.00 | 4.0631 |

[1] The total weight of all components in the base stock plus the calculated total amount of each component to add must equal the total weight of the reblended fluid, in the example, 24.0631 gms.

When the calculations have been completed as to the amount of each component which will be added to the disiloxane base stock fluid, the reblending or final phase of the process is accomplished.

Reblending

The quinizarin is recrystallized to remove impurities. This is done by mixing purified diethyl ether with the quinizarin and heating to the boiling point of the ether. The mixture is then boiled gently for several minutes and subsequently filtered. Next, the ether is boiled off the filtrate until the crystals just begin to precipitate. The mixture is then cooled rapidly. At this point bright orange plates will form. The excess ether is decanted off and the plates dryed in an oven. By recrystallizing the quinizarin, its solubility is increased. This is important because the quinizarin is a polar material, while the hexa (2-ethyl butoxy) disiloxane is non-polar, making it difficult to dissolve completely in the fluid.

Next, the proper amounts of each of the additives, together with the base stock fluid which was reclaimed are weighed out and blended together, under nitrogen if possible, and with adequate agitation at 200° F. Then the oil is filtered through a medium porosity fritted glass filter or asbestos mat to remove fine particles of quinizarin which did not dissolve, as well as any other foreign matter which may have been picked up. After the fluid has been filtered, it should be sealed under nitrogen or vacuum for storage. The chemical and physical properties before and after reclamation, as well as a comparison of the reclaimed fluid with the virgin fluid, is given in the tabulation below:

| Used fluid | Virgin fluid | Reclaimed fluid |
| --- | --- | --- |
| Viscosity at 210° F.= 6.84 cs. | Viscosity at 210° F.= 8.25 cs. | Viscosity at 210° F.= 8.28 cs. |
| Acid number=.118 | Acid number=.05 | Acid number=.049. |
| Flash point=340° F. | Flash point=395° F. | Flash point=395° F. |
| Water content=400 p.p.m. | Water content=85 p.p.m. | Water content=100 p.p.m. |
| Appearance, sediment. | Appearance, clear. | Appearance, clear. |

We claim:

1. The method for recovering the hexa (2-ethyl butoxy) disiloxane base of a hydraulic fluid for reuse free of decomposition products and contaminants contained in said fluid, said hydraulic fluid including as constituents hexa (2-ethyl butoxy) disiloxane, methyl ethyl silicone, p,p′ dioctyldiphenylamine, and quinizarin, the method comprising first passing said hydraulic fluid through a filter to remove any metal particles, sludge, and water thereform, next subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, next subjecting the separated hexa (2-ethyl butoxy) disiloxane and methyl ethyl silicone to a second extraction by mixing said separated ingredients with acetone, withdrawing the resultant acetone-disiloxane mixture and removing the acetone therefrom by distillation, introducing nitrogen into the disiloxane remainder and drawing a vacuum thereon, and then heating the result to a temperature in the approximate range of from 145° C. to 155° C. under a vacuum of approximately 20 mm. mercury to remove any 2-ethyl-1-butanol.

2. The method for recovering the hexa (2-ethyl butoxy) disiloxane base of a hydraulic fluid for reuse free of decomposition products and contaminants contained in said fluid, said hydraulic fluid including as constituents hexa (2-ethyl butoxy) disiloxane, methyl ethyl silicone, p,p′ dioctyldiphenylamine, and quinizarin, the method comprising first passing said hydraulic fluid through a filter to remove any metal particles, sludge, and water therefrom, next subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, and subjecting the separated hexa (2-ethyl butoxy) disiloxane and methyl ethyl silicone to a second extraction by mixing said separated ingredients with acetone, withdrawing the resultant acetone-disiloxane mixture, and removing the acetone therefrom by distillation.

3. The method for recovering the hexa (2-ethyl butoxy) disiloxane base of a hydraulic fluid for reuse free of decomposition products and contaminants contained in said fluid, said hydraulic fluid including as constituents hexa (2-ethyl butoxy) disiloxane, methyl ethyl silicone, p,p′ dioctyldiphenylamine, and quinizarin, the method comprising subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, next subjecting the separated hexa (2-ethyl butoxy) disiloxane and methyl ethyl silicone to a second extraction by mixing said separated ingredients with acetone, withdrawing the resultant acetone-disiloxane mixture and removing the acetone therefrom, introducing nitrogen into the disiloxane remainder and drawing a vacuum thereon, and then heating the result to a temperature in the approximate range of from 145° C. to 155° C. under a vacuum of approximately 20 mm. mercury to remove any 2-ethyl-1-butanol.

4. The method for recovering the hexa (2-ethyl butoxy) disiloxane base of a hydraulic fluid for reuse free of decomposition products and contaminants contained in said fluid, said hydraulic fluid including as constituents hexa (2-ethyl butoxy) disiloxane, methyl ethyl silicone, p,p′ dioctyldiphenylamine, and quinizarin, the method comprising subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, and subjecting the separated hexa (2-ethyl butoxy) disiloxane and methyl ethyl silicone to a second extraction by mixing said separated ingredients with acetone, drawing off the acetone-disiloxane mixture, and removing the acetone therefrom.

5. The method for recovering the hexa (2-ethyl butoxy) disiloxane base of a first hydraulic fluid free of decompositon products and contaminants and for the reblending of said base to produce a useful second hydraulic fluid therefrom substantially similar in composition to said first hydraulic fluid, said first hydraulic fluid including as constituents hexa (2-ethyl butoxy) disiloxane, methyl ethyl silicone, p,p′ dioctyldiphenylamine, and quinizarin, the method comprising first passing said first hydraulic fluid through a filter to remove any metal particles, sludge and water therefrom, next subjecting said hydraulic fluid to a first extraction comprising mixing same with alcoholic potassium hydroxide prepared from a .115 N solution of purified methanol and potasisum hydroxide to separate the hexa (2-ethyl butoxy) disiloxane and methyl ethyl silicone from the other of the said fluid constituents and from said decomposition products and contaminants, next subjecting the separated hexa (2-ethyl butoxy) disiloxane and methyl ethyl silicone to a second extraction by mixing said separated ingredients with acetone, withdrawing the resultant acetone-disiloxane mixture and removing the acetone therefrom by distillation, introducing nitrogen into the disiloxane remainder and drawing a vacum thereon, heating the result to a temperature in the approximate range of from 145° C. to 155° C. under a vacuum of approximately 20 mm. mercury to remove any 2-ethyl-1-butanol, analyzing the resultant composition to determine the constituents therein and their respective quantities, and adding thereto in predetermined carefully controlled quantities, methyl ethyl silicone, p,p' dioctyldiphenylamine, and quinizarin to produce said second hydraulic fluid.

6. The method of claim 5 wherein the quinizarin is recrystallized prior to said addition to remove impurities and to increase its solubility, said recrystallization being accomplished by mixing purified diethyl ether with the quinizarin and heating this mixture to the boiling point of said ether and holding said temperature for several minutes to produce a filtrate, next boiling off the ether from said filtrate until crystals of the quinizarin begin to precipitate, rapidly cooling said filtrate, then decanting off any excess ether, and finally drying the quinizarin at an elevated temperature.

7. The method for recovering the hexa (2-ethyl butoxy) disiloxane base of a first hydraulic fluid free of decomposition products and contaminants and for the reblending of said base to produce a useful second hydraulic fluid therefrom substantially similar in composition to said first hydraulic fluid, said first hydraulic fluid including as constituents hexa (2-ethyl butoxy) disiloxane, methyl ethyl silicone, p,p' dioctyldiphenylamine, and quinizarin, the method comprising subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, next subjecting the separated hexa (2-ethyl butoxy) disiloxane and methyl ethyl silicone to a second extraction by mixing said separated ingredients with acetone, withdrawing the resultant acetone-disiloxane mixture and removing the acetone therefrom, introducing nitrogen into the disiloxane remainder and drawing a vacuum thereon, and then heating the result to a temperature in the approximate range of from 145° C. to 155° C. under a vacuum of approximately 20 mm. mercury to remove any 2-ethyl-1-butanol, analyzing the resultant composition to determine the constituents therein and their respective quantities, and adding thereto in predetermined carefully controlled quantities, methyl ethyl silicone, p,p' dioctyldiphenylamine, and quinizarin to produce said second hydraulic fluid.

8. The method of claim 7, wherein the quinizarin is recrystallized prior to said addition to remove impurities and to increase its solubility, said recrystallization being accomplished by mixing purified diethyl ether with the quinizarin and heating this mixture to the boiling point of said ether and holding said temperature for several minutes to produce a filtrate, next boiling off the ether from said filtrate until crystals of the quinizarin begin to precipitate, rapidly cooling said filtrate, then decanting off any excess ether, and finally drying the quinizarin at an elevated temperature.

9. The method for recovering the hexa (2-ethyl butoxy) disiloxane base of a hydraulic fluid for reuse free of decomposition products and contaminants contained in said fluid, said hydraulic fluid including as constituents hexa (2-ethyl butoxy) disiloxane, methyl ethyl silicone, p,p' dioctyldiphenylamine, and quinizarin, the method including the step of subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants.

10. The method for recovering the hexa (2-ethyl butoxy) disiloxane base of a hydraulic fluid for reuse free of decomposition products and contaminants contained in said fluid, said hydraulic fluid inclduing as constituents hexa (2-ethyl butoxy) disiloxane, methyl ethyl silicone, p,p' dioctyldiphenylamine, and quinizarin, the method comprising subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, the separated hexa (2-ethyl butoxy) disiloxane and methyl ethyl silicone then being subjected to a washing with methanol to remove therefrom residual potassium hydroxide, next subjecting the separated hexa (2-ethyl butoxy) disiloxane and methyl ethyl silicone to a second extraction by mixing said separated ingredients with acetone, withdrawing the resultant acetone-disiloxane mixture and removing the acetone therefrom, introducing nitrogen into the disiloxane remainder and drawing a vacuum thereon, and then heating the result to a temperature in the approximate range of from 145° C. to 155° C. under a vacuum of approximately 20 mm. mercury to remove any 2-ethyl-1-butanol.

11. The method for recovering the hexa (2-ethyl butoxy) disiloxane base of a hydraulic fluid for reuse free of decomposition products and contaminants contained in said fluid, said hydraulic fluid including as constituents hexa (2-ethyl butoxy) disiloxane, methyl ethyl silicone, p,p' dioctyldiphenylamine, and quinizarin, the method comprising subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, the separated hexa (2-ethyl butoxy) disiloxane and methyl ethyl silicone then being subjected to a washing with methanol to remove therefrom residual potassium hydroxide, and subjecting the separated hexa (2-ethyl butoxy) disiloxane and methyl ethyl silicone to a second extraction by mixing said separated ingredients with acetone, drawing off the acetone-disiloxane mixture, and removing the acetone therefrom.

12. The method for recovering the hexa (2-ethyl butoxy) disiloxane base of a first hydraulic fluid free of decomposition products and contaminants and for the reblending of said base to produce a useful second hydraulic fluid therefrom substantially similar in composition to said first hydraulic fluid, said first hydraulic fluid including as constituents hexa (2-ethyl butoxy) disiloxane, methyl ethyl silicone, p,p' dioctyldiphenylamine, and quinizarin, the method comprising first passing said first hydraulic fluid through a filter to remove any metal particles, sludge and water therefrom, next subjecting said hydraulic fluid to a first extraction comprising mixing same with alcoholic potassium hydroxide prepared from a .115 N solution of purified methanol and potassium hydroxide to separate the hexa (2-ethyl butoxy) disiloxane and methyl ethyl silicone from the other of the said fluid constituents and from said decomposition products and contaminants, the separated hexa (2-ethyl butoxy) disiloxane and methyl ethyl silicone then being subjected to a washing with methanol to remove therefrom residual potassium hydroxide, next subjecting the separated hexa (2-ethyl butoxy) disiloxane and methyl ethyl silicone to a second extraction by mixing said separated ingredients with acetone, withdrawing the acetone-disiloxane mixture and removing the acetone therefrom by distillation, introducing nitrogen into the disiloxane remainder and drawing a vacuum thereon, heating the result to a temperature in the approximate range of from 145° C. to 155° C. under a vacuum of approximately 20 mm. mercury to remove any 2-ethyl-1-butanol, analyzing the resultant composition to determine the constituents therein and their respective quantities, and adding thereto in predetermined carefully controlled quantities, methyl ethyl silicone, p,p'- dioctyldiphenylamine, and quinizarin to produce said second hydraulic fluid.

References Cited in the file of this patent

UNITED STATES PATENTS

| | | |
|---|---|---|
| 2,960,474 | Furby et al. | Nov. 15, 1960 |
| 3,019,191 | Furby et al. | Jan. 30, 1962 |

FOREIGN PATENTS

| | | |
|---|---|---|
| 777,100 | Great Britain | June 19, 1957 |

OTHER REFERENCES

Georgi: "Motor Oils and Engine Lubrication," Reinhold Publ. Corp., New York, 1950, pp. 479–82. (Copy available in Div. 64.)